United States Patent [19]

Krajicek et al.

[11] Patent Number: 5,032,054
[45] Date of Patent: Jul. 16, 1991

[54] AERIAL BUNDLE PULLER

[75] Inventors: Richard W. Krajicek, Houston, Tex.; Robert R. Cradeur, Sulphur, La.

[73] Assignee: Serv-Tech, Inc., Lake Charles, La.

[21] Appl. No.: 400,154

[22] Filed: Aug. 29, 1989

Related U.S. Application Data

[63] Continuation of Ser. No. 116,773, Nov. 4, 1987, Pat. No. 4,869,638.

[51] Int. Cl.⁵ .............................................. B66F 19/00
[52] U.S. Cl. ................................ 414/745.3; 29/726.5; 294/86.41; 414/661
[58] Field of Search .................... 294/86.41; 29/726.5; 414/280, 626, 661, 745.3

[56] References Cited

U.S. PATENT DOCUMENTS

| | | | |
|---|---|---|---|
| 3,048,280 | 8/1962 | Huff et al. | 414/745.3 |
| 3,180,498 | 4/1965 | Postlewaite | 414/745.3 |
| 3,239,077 | 3/1966 | Huff et al. | 414/745.3 |
| 3,403,728 | 10/1968 | Richardson et al. | 166/355 |
| 3,567,044 | 3/1971 | Travis | 414/745.3 |
| 3,658,191 | 4/1972 | Murphy | 414/745.3 |
| 3,765,544 | 10/1973 | Murphy | 414/745.3 |
| 3,836,015 | 9/1974 | Travis | 414/745.3 |
| 4,227,854 | 10/1980 | Coffey | 414/745.3 |
| 4,323,398 | 4/1982 | Simon | 134/18 |

Primary Examiner—Robert J. Spar
Assistant Examiner—Janice Krizek
Attorney, Agent, or Firm—William David Kiesel; Robert C. Tucker

[57] ABSTRACT

An aerial tube bundle puller for extracting a tube bundle from a heat exchanger is provided, comprising a cradle supporting a carriage frame and a power source, a sled, attachable to a tube bundle, with a hydraulic powered screw drive to propel the sled on the carriage frame, a hydraulic elevator slidable on the carriage frame for adjusting and supporting the tube bundle and an extension for adjusting the length of the carriage frame.

5 Claims, 6 Drawing Sheets

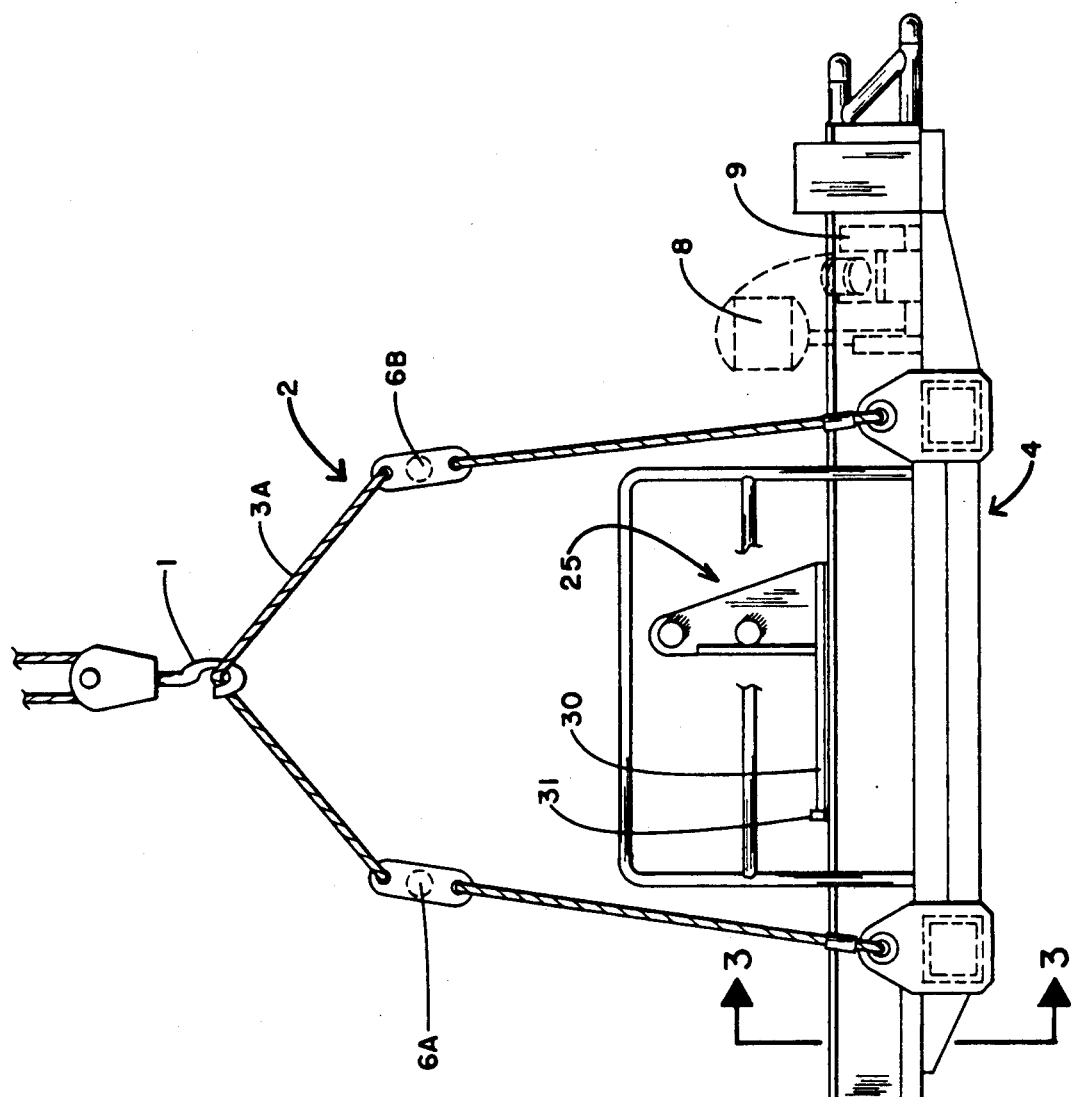
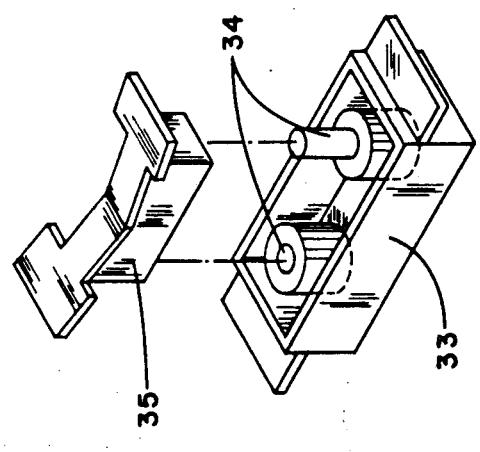
FIGURE 2
FIGURE 2A

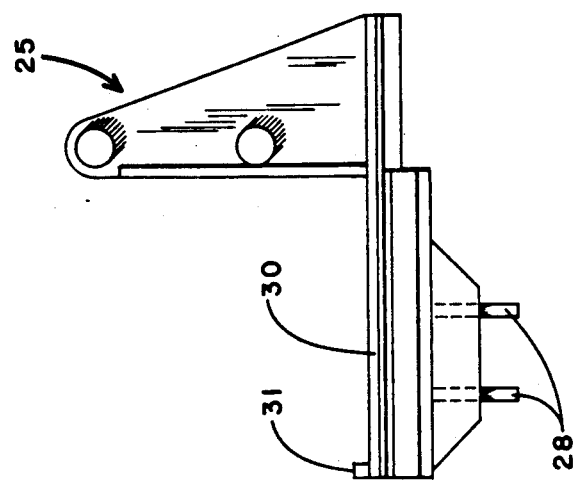
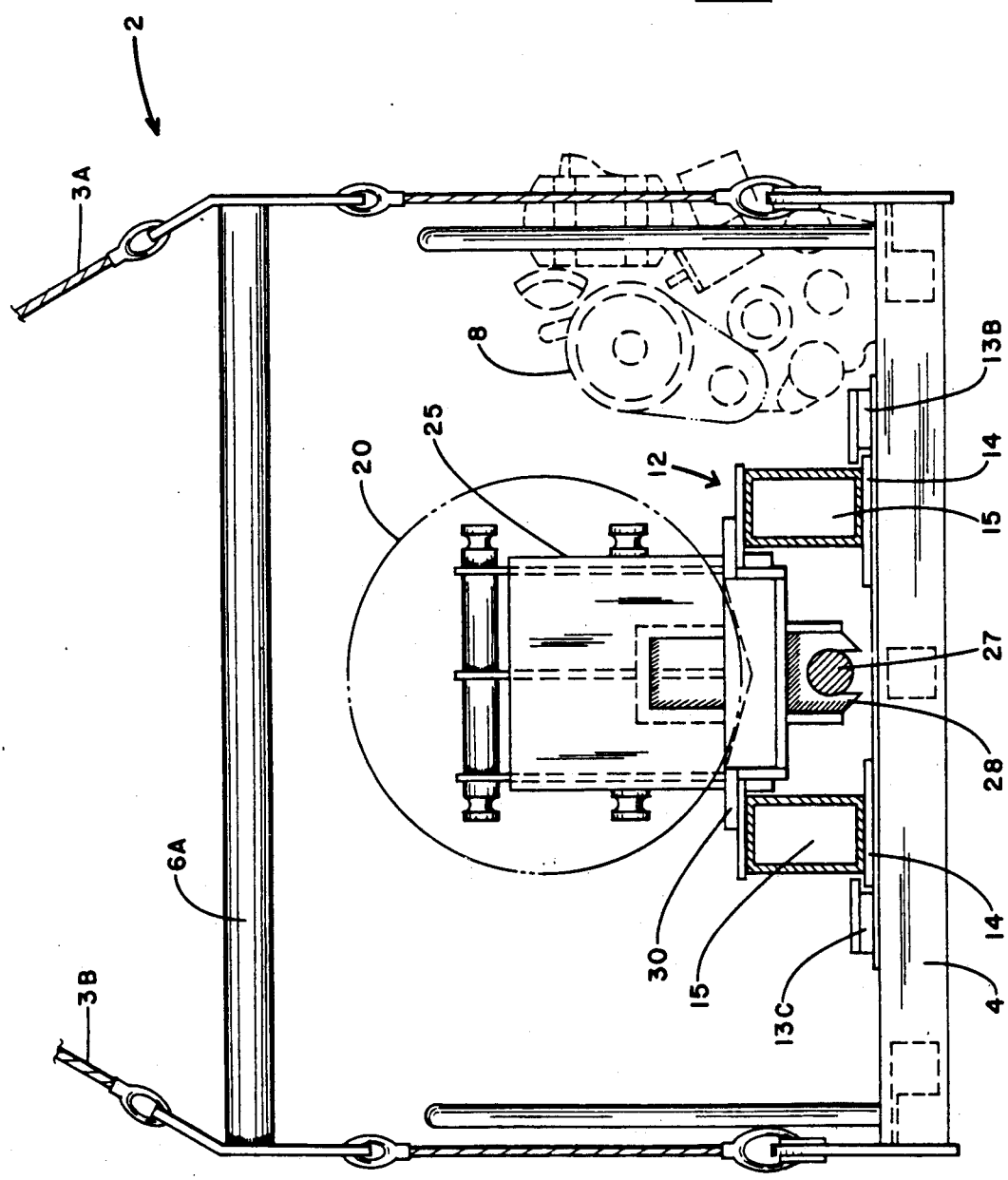

AERIAL BUNDLE PULLER

RELATED APPLICATIONS

This application is a continuation of U.S. patent application Ser. No. 07/116,773 filed on Nov. 4, 1987, and now U.S. Pat No. 4,869,638 specific mention being made herein to obtain the benefit of its earlier filing date.

BACKGROUND OF THE INVENTION

1. Field of the Invention

This invention relates generally to a puller to extract the tube bundles from a heat exchanger and more particularly to a puller which can be suspended from a crane to work on elevated heat exchangers.

2. Prior Art

Shell and tube heat exchangers constitute a substantial portion of heat transfer equipment in chemical process plants. Heat transfer between two streams at different temperatures is accomplished by flowing one stream through tubes arranged in a tube bundle and flowing the second stream past the outside of the tubes, on the shell side. Scale and sediment build up on both the outside and inside of the tubes during use. After a period, these deposits decrease the efficiency of heat transfer across the tube walls. The heat exchanger is cleaned by extracting the tube bundle from the shell and hydro-blasting the inside of the shell and the inside and outside of the tubes. Examples of the cleaning process may be found in Simon, U.S. Pat. No. 4,323,398 and Cradeur, U.S. Pat. No. 3,938,535.

Occasionally, the heat exchangers are located high above the ground in the superstructure of a process unit. Several prior art tube bundle pullers are adapted to be lifted by a crane to service these elevated exchangers such as Travis, U.S. Pat. Nos. 3,567,044 and 3,836,015, Postlewaite, U.S. Pat. No. 3,180,498 and Coffey, U.S. Pat. No. 4,227,854.

Pulling the tube bundle of a heat exchanger requires a significant force. The tube bundle itself typically weighs 15-20,000 lbs. and it is not unusual for there to be an additional force required to break the bundle loose from where it has adhered to the shell. In the above mentioned bundle pullers a variety of mechanisms have been used to apply the necessary force, such as hydraulic cylinders and air motor/screw combinations. In the above bundle pullers, the source of either the hydraulic power or compressed air is an auxillary unit not contained on the bundle puller. The auxillary unit presents an additional line which must be connected to the bundle puller. Not only does this decrease the mobility of the bundle puller, but significant power losses can occur due to pressure drops along lengths of hose.

Tube bundles as long as 20 feet are not uncommon. The tubes are usually secured at one end in a tube sheet and may be U shaped or straight. If straight, the tubes are usually secured at their opposite end to a second tube sheet. Along the length of the tubes, baffles are provided to both hold the tubes together and to direct the flow of fluid on the shell side of the exchanger. Once the tube bundle is removed from the shell, means must be provided to support the bundle. Prior art methods of supporting the tube bundle upon removal are slings as shown in Murphy, U.S. Pat. Nos. 3,658,191 and 3,765,544 and support trolleys as shown in Coffey, U.S. Pat. No. 4,227,854.

SUMMARY OF THE INVENTION

Therefore one object of this invention is to provide an aerial tube bundle puller with a self-contained power source.

Another object of this invention is to provide a relatively simple method to support and adjust the tube bundle on the tube bundle puller.

Still another object of the invention is to provide a tube bundle puller which can be extended in length to accommodate various tube bundle lengths.

Accordingly, an aerial tube bundle puller is provided comprising a cradle with a support frame and suspension means, a longitudinally extendable carriage frame slidable on said support frame, a sled slidable on said carriage frame with means for propulsion, a self-contained power source and an elevator, slidable on said carriage frame and capable of raising or lowering a tube bundle.

BRIEF DESCRIPTION OF THE DRAWING

FIG. 2 is a side view of the aerial bundle puller.

FIG. 2A is an exploded perspective view of the elevator.

FIG. 3 is a cross sectional view taken along line 3—3 in FIG. 2.

FIG. 4 is a side view of the sled.

PREFERRED EMBODIMENTS OF THE INVENTION

Without limiting the scope of this invention, a preferred embodiment of the invention will be described.

Referring to FIG. 2, the tube bundle puller is suspended from hook 1 by superstructure 2. Superstructure 2 comprises cables 3A and 3B which are connected at each end to support frame 4. Spreader bars 6A and 6B force cables 3A and 3B apart to allow room for a tube bundle as shown in FIG. 3.

Figure 1:
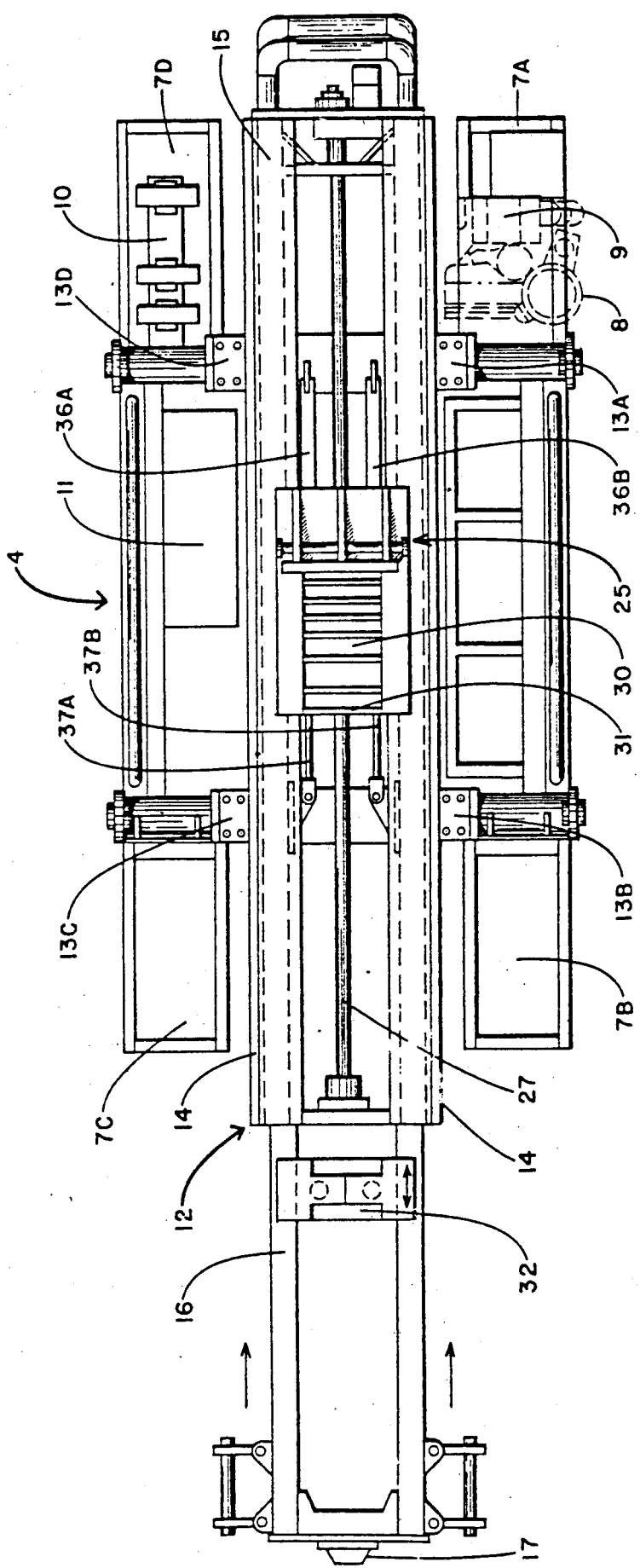
FIG. 1 is an overhead view of the aerial bundle puller.

Referring to FIG. 1, support frame 4 is a rectangular steel frame with arms 7 A-D projecting outward. Secured to arm 7A is diesel engine 8 and hydraulic pump 9. The control valves 10 which direct hydraulic fluid to the various hydraulic lines are located on arm 7D. A hydraulic fluid reserve 11 is also secured to support frame 4. Several important advantages are to be found in placing the power source on support frame 4. There are no extra lines from an auxillary power source such as an engine and hydraulic pump. This allows the aerial bundle puller to be moved more easily from heat exchanger to heat exchanger within a process unit. Also the power loss is less because the on board power source is at the same height and location as the bundle puller, thereby minimizing hose length and pressure drop.

Less power loss means that a smaller motor, one that can fit on the bundle puller itself, can be used. Diesel engine 8 is a 17 horse power diesel engine giving the bundle puller a 40 ton pulling capacity.

Carriage frame 12 rests on support frame 4. In the preferred embodiment shown in FIG. 3, carriage frame 12 is longitudinally slidable on support frame 4 and is guided by brackets 13 A-D which engage flange 14 on either side of carriage frame 12. Carriage frame 12 is further comprised of stationary portion 15 and extension 16. As shown in FIGS. 1 and 2, extension 16 telescopes out of stationary portion 15. It is also intended that the term "telescope" include the methods whereby the two parts are matingly slidable with respect to one another. Extension 16 allows the bundle puller to adapt to various tube bundle lengths and conditions. Extension 16 is operatively connected to hydraulic pump 9 and operated thereby. Obstructions and pipes around a heat exchanger make maneuverability essential. As shown in FIG. 2, the tip of extension 16 has been engineered for minimum thickness.

When pulling a tube bundle from a heat exchanger, it is often necessary to brace extension 16 against a fixed object. FIG. 1 shows brace holder 17 fitted to the end of extension 16. Brace holder 17 is engineered so that a "4×4" piece of timber can be braced against the bundle puller without danger of sliding off.

Figure 7:
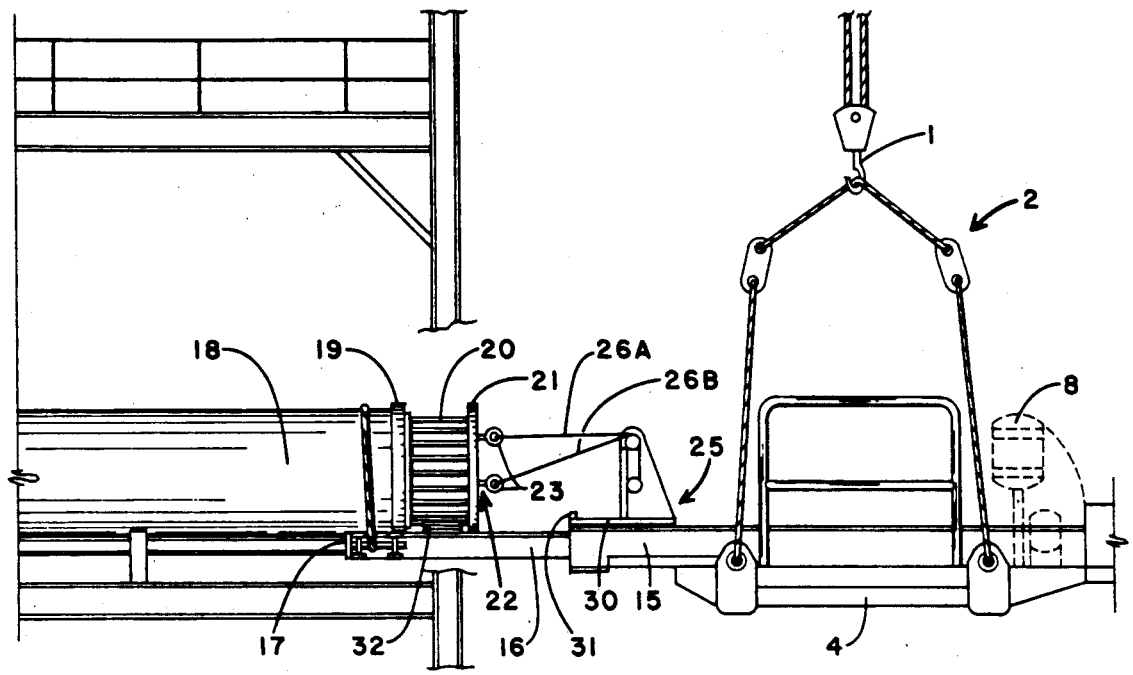
FIG. 7 is a side view of a tube bundle being extracted.
Figure 7A:
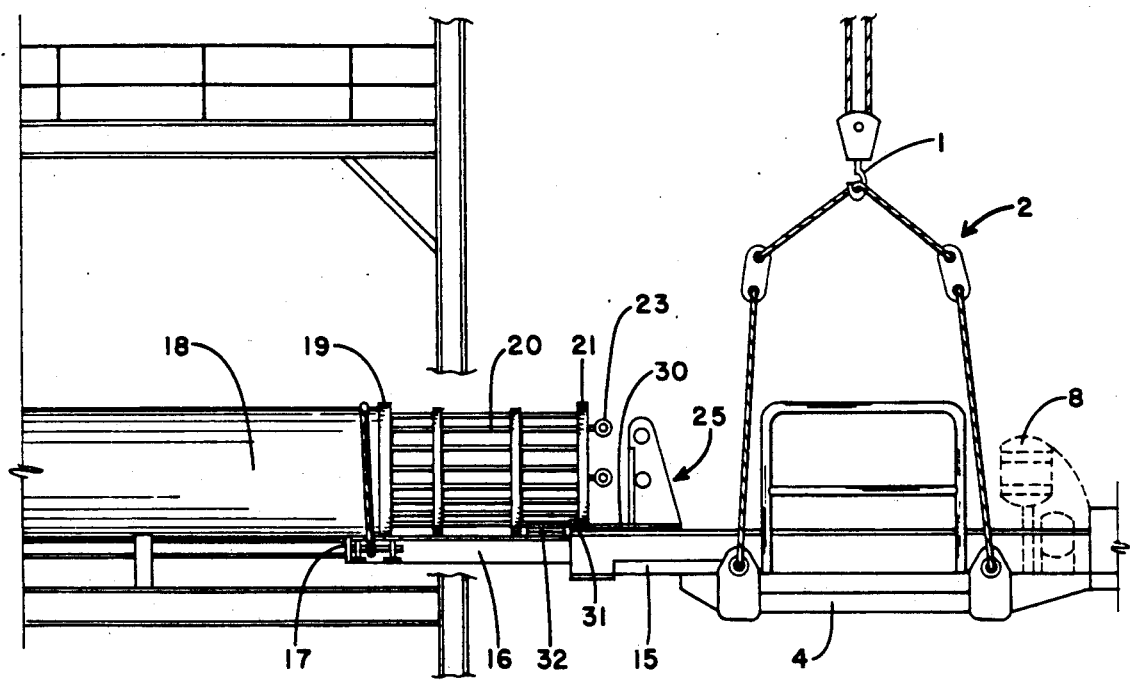
FIG. 7A is a side view of a tube bundle partially extracted and supported on the bed of the sled.

Once the length of the carriage frame 12 has been set and the puller braced against a fixed object, the end of carriage frame 12 is secured to shell 18 as shown in FIGS. 7-7A. The bundle puller herein is capable of attaching to the shell 18 in various ways depending upon the individual circumstances and available working area around the shell. One preferred method is to wrap a chain around shell 18. Another method is to insert a dowel through the holes in the shell flange 19 and chain the carriage frame to the dowel (not shown). It is necessary to secure the carriage frame 12 to shell 18 because when the tube bundle 20 is first pulled loose, the bundle puller is not balanced. Only after the tube bundle 20 is free from the shell will the carriage frame be shifted in relation to the support frame to balance the load. After the load has been balanced, the carriage frame 12 is released from shell 18 as will be described later.

The majority of tube bundles 20 are provided with a tube sheet 21 which secures the tube ends. Tube sheet 21 has tapped holes 22 which are available for hooks 23 to be screwed into. Cables 26 A, B connect hooks 23 and sled 25. Sled 25 slides longitudinally on carriage frame 12 to pull or push tube bundle 20.

Figure 5:
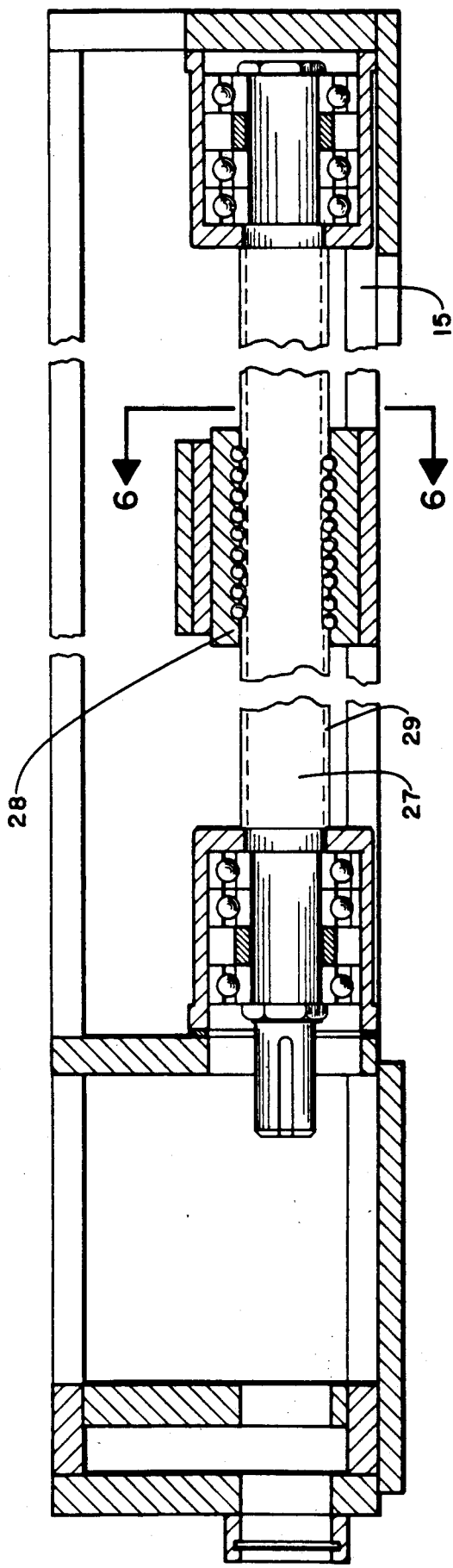
FIG. 5 is a side cut away view of the screw drive.
Figure 6:
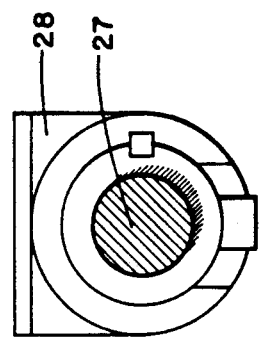
FIG. 6 is a cross sectional view along line 6—6 in FIG. 5.

In the preferred embodiment sled 25 is propelled by hydraulic powered screw drive 27. Details of screw drive 27 are shown in FIGS. 5 and 6. Screw drive 27 is mounted longitudinally on carriage frame 12 and engages the underside of sled 25. A plurality of ball bearings are provided within coupling 28 to minimize friction and ride within the threads 29 of screw drive 27. Of course, other means may be employed by those with skill in the art to propel sled 25 along carriage frame 12. For example, a hydraulically powered motor could be mounted on sled 25 to engage a track on carriage frame 12. To minimize the attachment of hydraulic lines to moving parts, it is preferred that the propulsion means be mounted on the carriage frame 12. While carriage frame 12 does move in relation to support frame 4, this distance is less than the distance travelled by sled 25.

Tube bundle 20 is extracted from shell 18 in a two step process. In the first step shown in FIG. 7, sled 25 is connected to tube sheet 21 by cables 26 A and B. Sled 25 is propelled away from shell 18 by activating screw drive 27. This extracts tube bundle 20 a distance sufficient to expose tube sheet 21. The distance must also be sufficient to allow sled 25 to be reversed and slid underneath tube sheet 21 as hereinafter described. Referring to FIG. 4, sled 25 has bed 30 which is shaped to fit beneath tube sheet 21. Bed 30 has lip 31 which engages tube sheet 21 when sled 25 extracts tube bundle 21. It is crucial that tube bundle 20 be pulled out far enough that sled 25 can retract enough on the stationary portion 15 of carriage frame 12 containing screw drive 27, to fit underneath tube sheet 21. It is also necessary that the lower edge of tube sheet 21 be low enough so that once lifted on to bed 30, tube sheet 21 may be engaged by lip 31.

Once the tube bundle 20 is in correct position, the next step of the process is to place tube sheet 21 on to bed 30 as shown in FIG. 7A. This may be accomplished by lowering and raising the entire tube bundle puller by crane. An easier method is to use elevator 32. Referring to FIG. 2A, elevator 32 is comprised of a base 33 which is slidable on carriage frame 12, both on stationary portion 15 and extension 16. Base 33 supports hydraulic jack 34 and lift 35 which are adapted to slide under and raise tube bundle 20. Elevator 32 is slid under tube bundle 20 during or after the first step described above. Next, tube bundle 20 is raised and sled 25 is retracted to position bed 30 beneath tube sheet 21. Tube bundle 20 is then lowered on to bed 30 and sled 25 is propelled away again from shell 18.

As tube bundle 20 is pulled free of shell 18, it often sags. Elevator 32 can be repositioned to raise the sagging portion of tube bundle 20. In some cases it may be necessary to provide a second elevator to support a tube bundle. Elevator 32 is also useful in preventing tube bundle 20 from dropping and getting damaged as tube bundle 20 is pulled completely free of shell 18.

Figure 7B:
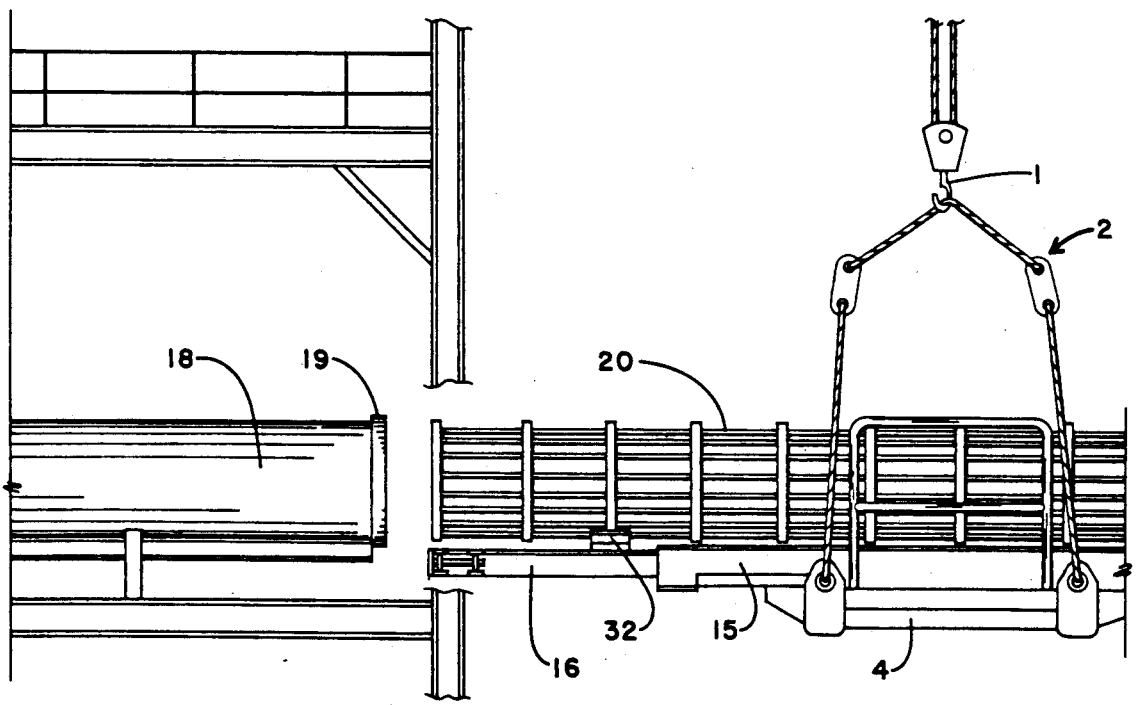
FIG. 7B is a side view of a tube bundle extracted from the shell and balanced on the aerial bundle puller.

Once tube bundle 20 is free of shell 18, it is desirable to balance the bundle puller and tube bundle 20 in relation to hook 1. Hydraulic cylinders 36 A and B and piston rods 37 A and B are connected to carriage frame 12 and support frame 4 respectively. Activating the hydraulic cylinder/piston shifts the carriage frame and load with respect to support frame 4. When the load is balanced, carriage frame 12 can be disconnected from shell 18 as in FIG. 7B. The tube bundle 20 can then be lowered to the ground.

Reinserting tube bundle 20 is basically the opposite of extraction. The carriage frame 12 must be secured to a fixed object to prevent the bundle puller from being pushed away from the shell 18 during reinsertion. Elevator 32 is used in aligning tube bundle 20 at the same height as shell 18.

There are, of course, many obvious alternate embodiments and modifications to this invention which are intended to be included in the scope of the following claims.

What we claim is:

1. An aerial tube bundle puller for extracting a tube bundle from a heat exchanger, comprising:
   (a) a cradle having a support frame and a superstructure connected to said support frame for suspending said support frame from above;
   (b) a longitudinally extendable carriage frame having a stationary portion overlaying said support frame and engaged therewith, and a telescoping portion matingly slidable in relation to said stationary portion, said telescoping portion being slidable relative to said stationary portion to allow tube bundles of varying lengths to be extracted from heat exchangers;

(c) a sled longitudinally slidable on said stationary portion of said carriage frame, said sled having means to engage said tube bundle;

(d) means connected to said sled and said stationary portion of said carriage frame for propelling said sled along said stationary portion;

(e) a tube bundle support on said telescoping portion of said carriage frame, whereby said support is positioned below said tube bundle between an end of said tube bundle engaged with said sled and an opposite end of said tube bundle; and (f) means to power said sled propelling means.

2. An aerial bundle puller according to claim 1 wherein said power means is a hydraulic pump and said sled propelling means is hydraulically powered.

3. An aerial bundle puller according to claim 2 wherein said hydraulic pump is driven by a combustion engine, said pump and said engine being entirely supported by said cradle.

4. An aerial bundle puller according to claim 3 further comprising means, powered by said hydraulic pump, for extending said telescoping portion of said carriage frame from said stationary portion.

5. An aerial bundle puller according to claim 3, wherein said sled propelling means comprises a screw drive, powered by said hydraulic pump and mounted on said carriage frame, and a threaded coupling mounted on said sled.

* * * * *